O. M. OTTE.
AUTOMOBILE LAMP.
APPLICATION FILED JAN. 2, 1918.

1,309,448.

Patented July 8, 1919.
3 SHEETS—SHEET 1.

Witness
J. E. Nordstrom
H. A. Sandberg

Inventor
Otho M. Otte
By S. Arthur Baldwin
Attorney

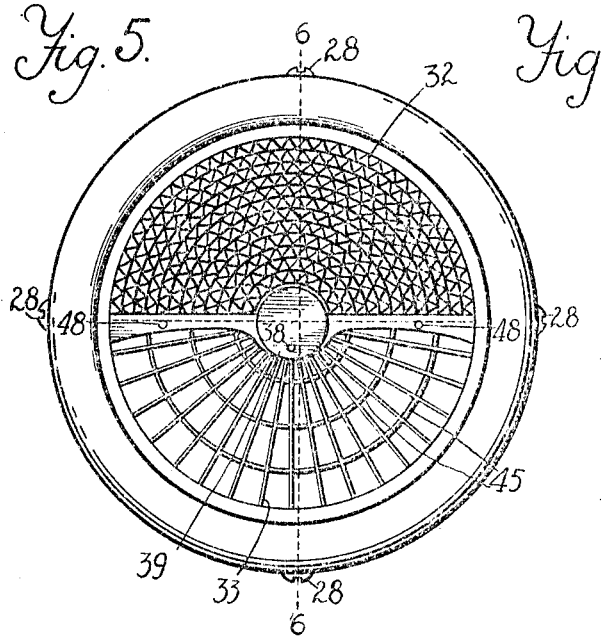
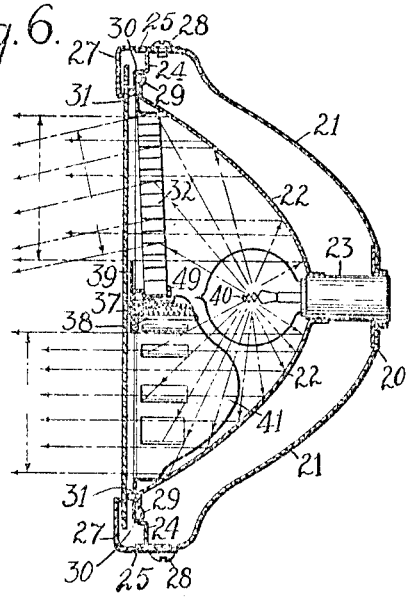
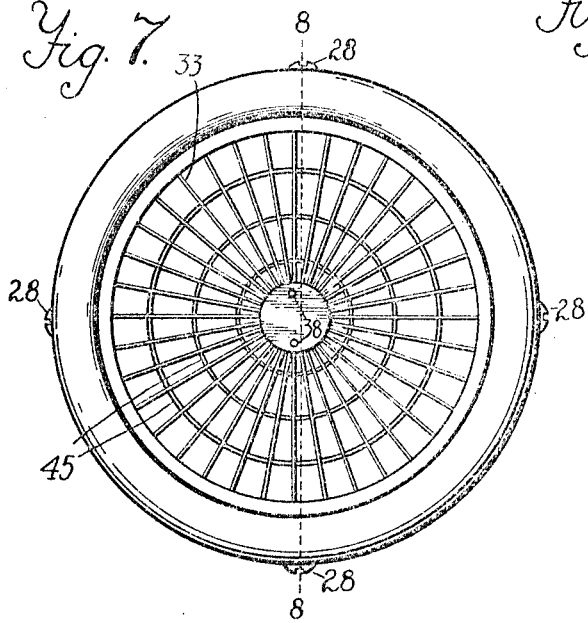
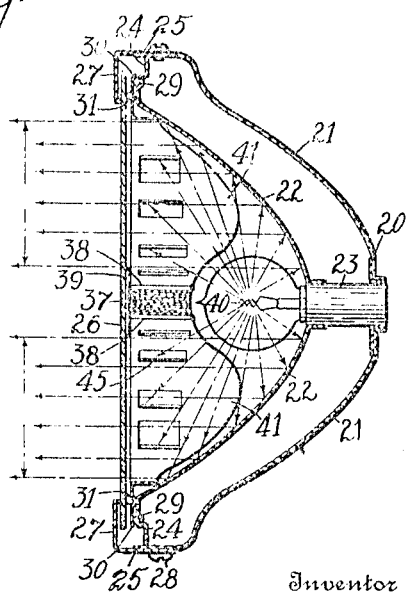

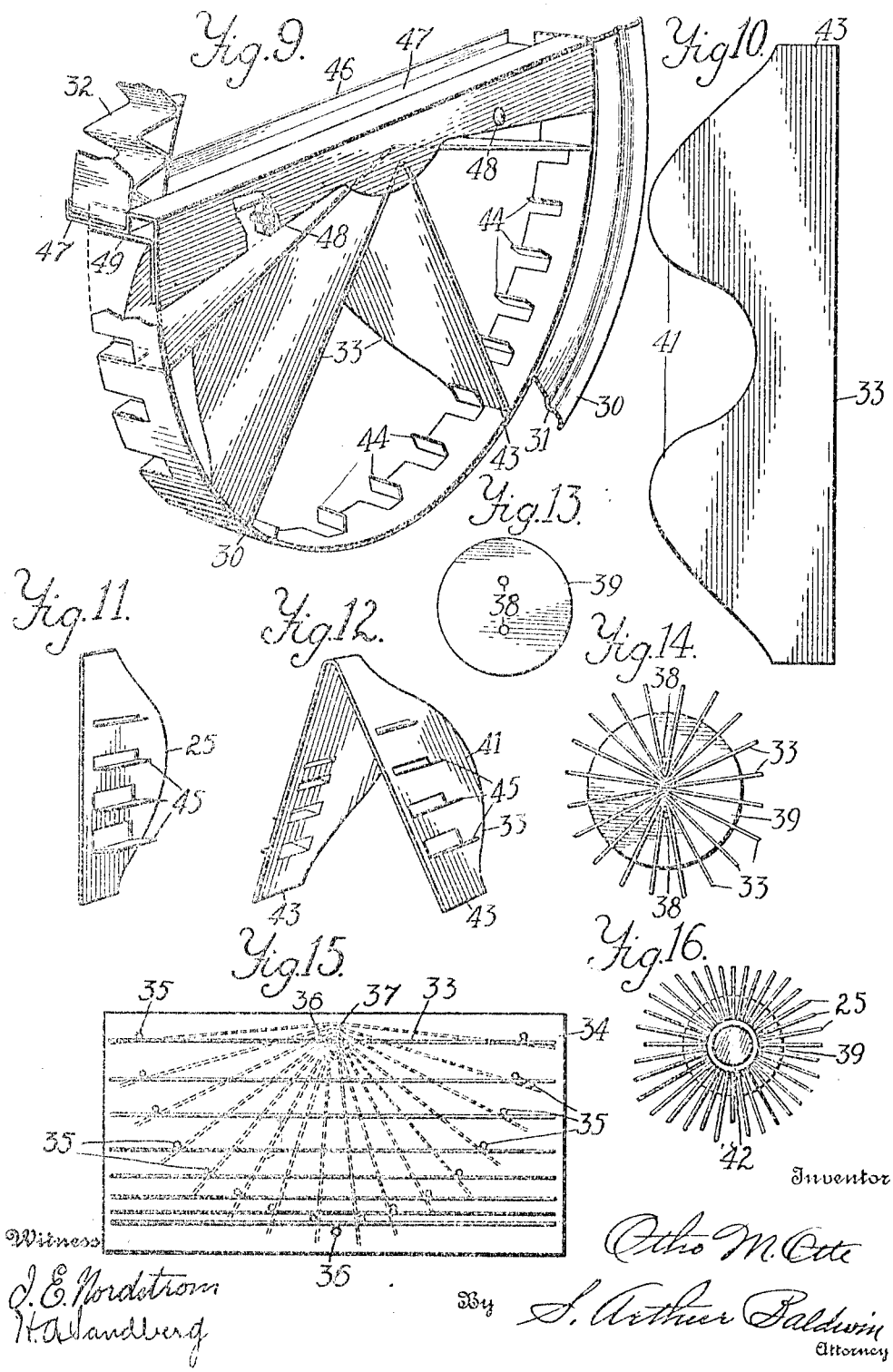

UNITED STATES PATENT OFFICE.

OTHO M. OTTE, OF JAMESTOWN, NEW YORK, ASSIGNOR TO RAYDEX MANUFACTURING COMPANY, OF BRACKENRIDGE, PENNSYLVANIA.

AUTOMOBILE-LAMP.

1,309,448.

Specification of Letters Patent.

Patented July 8, 1919.

Application filed January 2, 1918. Serial No. 209,909.

*To all whom it may concern:*

Be it known that I, OTHO M. OTTE, a citizen of the United States, residing at the city of Jamestown, in the county of Chautauqua and State of New York, have invented certain new and useful Improvements in Automobile-Lamps, of which the following, taken in connection with the accompanying drawings, is a specification.

The invention relates to lamps having parabolic reflectors; and the object of the improvement is to provide a sight intercepting multiple screen-reflector constructed so as not to intercept the line of light, except to a predetermined proportion of the rays for certain uses, the screen being provided with spaced radial non-reflecting blades which extend to within a short distance of the lamp or source of light so that said source of light is screened from the sight of the bystander or passerby unless he is directly in line with the rays of light, and for automobile head lights the upper portion is provided with a multiple tubular reflector which redirects the parallel reflected rays of light from the parabolic reflector downward so that none of the rays of light from said headlight will rise above a predetermined level; and the invention consists in novel features and combinations hereinafter set forth and claimed.

Figure 1:
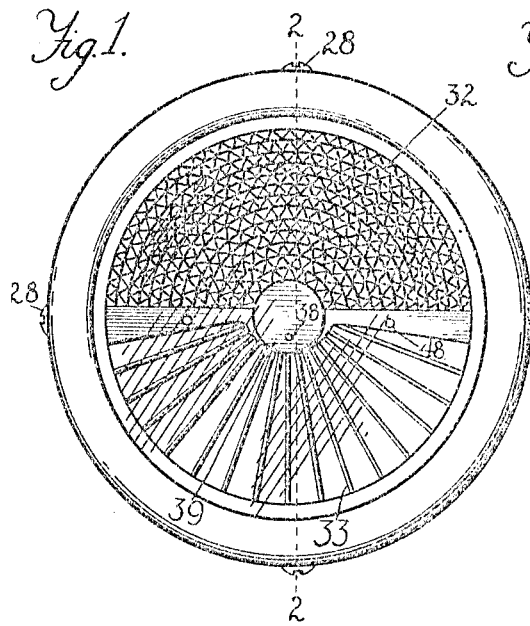
Figure 2:
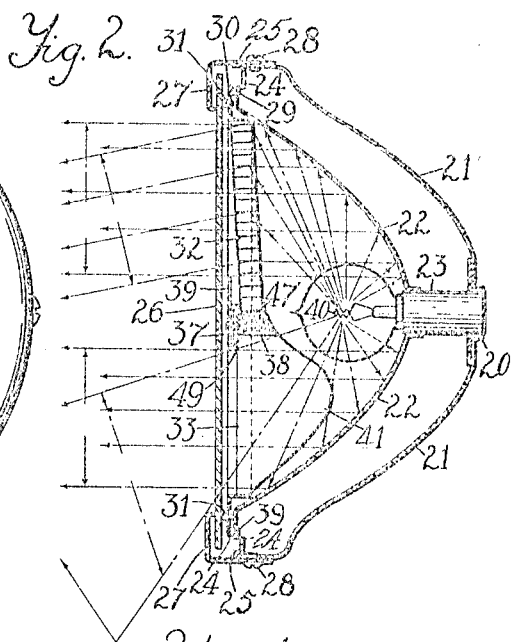
Figure 3:
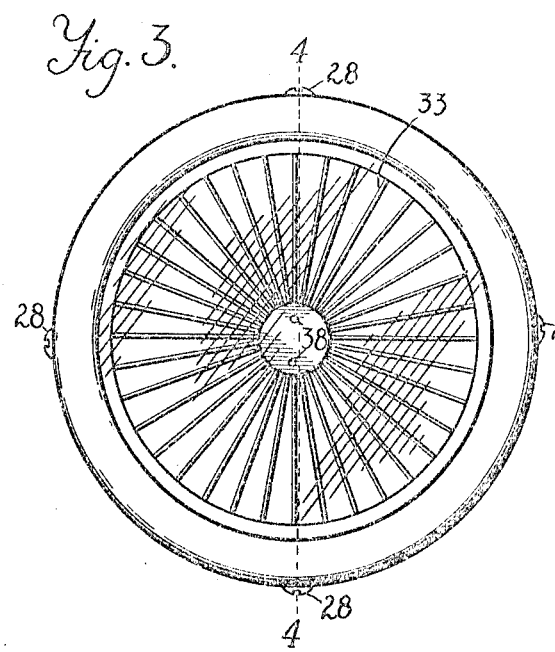
Figure 4:
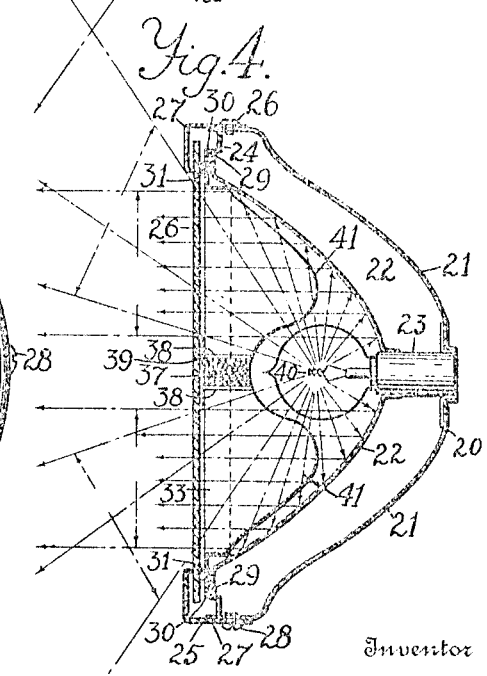

In the drawings, Figure 1 is a front elevation of an automobile head light; and Fig. 2 is a vertical sectional view at line 2—2 in Fig. 1 showing the multiple tubular screen-reflector in the upper portion and the radial blade sight intercepting non-reflecting screen in the lower portion, the sectional view showing the control of the rays of light by dotted lines. Fig. 3 is a front elevation of a spot light; and Fig. 4 is a vertical sectional view at line 4—4 in Fig. 3, showing the construction and arrangement of the multiple radial blade screen as applied to a spot light showing the wide angle permitted the direct rays and the free exit of the parallel reflected rays from the parabolic reflector while the sight of the passerby or bystander is intercepted by the radial blades. Fig. 5 is a front elevation of a head light; and Fig. 6 is a vertical sectional view at line 6—6 in Fig. 5; and Fig. 7 is a front elevation of a spot light; and Fig. 8 is a vertical sectional view at line 8—8 in Fig. 7 showing the radial blade multiple sight intercepting screen as shown in Figs. 1—4 with crosswise lugs struck from said blades to provide annular screens which stop the direct rays of light while permitting the free exit of the parallel reflected rays of light from the parabolic reflector. Fig. 9 is a perspective view of the radial blade lower portion of the head light type of lamp shown in Fig. 1 partially assembled showing the simple manner of construction preferred for said lower portion, one tier of the corrugated and flat upper portion being shown on the cross bar which sustains both the upper and lower screens to reveal the position and arrangement of the same, only four of the blades being in place in order to show the manner of placing and attaching said blades. Fig. 10 is a flat plan view of the double length blade plate before bending crosswise at the center to form two radial blades. Fig. 11 is a perspective view of a single length radial blade with the direct light intercepting lugs struck up thereon; and Fig. 12 is a similar view of a bent double length blade with the light intercepting lugs struck therefrom in opposite directions. Fig. 13 is an elevation of the plate for intercepting the direct central ray of the light; and Fig. 14 is an elevation of the rear side of said plate showing the manner of assembling the radial sight intercepting blades over spaced pins on said plate for a spot light. Fig. 15 shows the manner of bending the double length radial sight intercepting blades from straight flat strips into V-shaped radial blades, the assembling block having spaced pins for holding said blades in spaced relation near their outer ends. Fig. 16 is an elevation of a modification of the pin method of assembling the radial blades showing single length radial blades but welded to a central ring.

Like characters of reference refer to corresponding parts in the several views.

The numeral 20 designates a reflector lamp of either the headlight type or the spot light type. The two types of lamps 20 are each constructed with the parabolic shaped outer casing 21 which is held in spaced relation to the parabolic shaped reflector 22 by the light post 23 at the center of the reflector 22 and casing 21 and by the outwardly turned flange 24 around the outer rim of the reflector 22 which flange 24 braces against the inner wall of the rim 25 of the casing 21 thereby holding the outer rims of both the parabolic reflector 22 and the casing 21 firmly in position.

A glass 26 is provided to cover the front of the reflector 22, which glass is held in place by the inclosing rim 27 attached to the casing 21 by the spaced screws 28. A groove 29 is provided in the outwardly turned flanged rim 24 of the reflector 22 to receive therein a suitable packing 30 against which the supporting rim 31 for the multiple tubular screen-reflector 32 and radial blade sight intercepting screen 33 rest, to thereby prevent all rattling as well as to inclose the interior of the lamps 20 against admission of dust and dirt.

The rim 31 also has a groove 34 and packing 35 therein which extend around said rim of the vision screen-reflector 32 and radial sight intercepting screen 33 for the glass 26 to rest against so that all the parts may be held firmly in position in their proper relation to one another by means of the rim 27.

The vision intercepting radial blade screen 33 consists of a series of spaced radial blades which extend from the center to the periphery of the front of the parabolic reflector 22 for the spot light and from the center of the lower half to the periphery of said lower half of the headlight type of lamp, the upper portion being filled with the multiple tubular screen reflector shown in my former application for Letters Patent Serial No. 209903, filed Jan 2, 1918.

Each of the blades are double the length from the periphery of the screen to the center thereof, being bent crosswise at said center and V-shaped as shown in Figs. 9, 12 and 14. This is preferably attained as shown in Fig. 15 in which a block 34 has the pins 35 placed in semi-circular form and spaced as desired for the outer ends of one-half of the screen. A tool 36 is then pressed against the middle of the plate 33 pushing sidewise until said blades 33 are assembled and bent into the V-shaped forms shown in Fig. 14 and in dotted outline in Fig. 15, after which a drop of solder on the contacting blades at the points 37 attaches them to one another so that the blades form one piece and can be removed from the block 34 and placed over the pin 38 on the central plate 39, which plate 39 is placed at the center of the front of the screen in order to intercept the central ray of light from the lamp or source of light 40.

Each of the blades 33 extend inward as shown at 41 around the lamp 40 so as to intercept the sight from the lamp unless one is standing directly in front of the same. The blades 33 may be made of thin sheet metal as shown in the automobile head light type in Figs. 1 and 2, which permits the direct light to freely shine upon the roadway in front of the lamp and also permits a wide angle extension of the direct light in the spot light type shown in Figs. 3 and 4 as indicated by the dotted line, the reflected light being shown in parallel alinement from the parabolic reflector 22 and shining through the direct rays of light.

A modification of the method of attachment by means of the pins 38 and V-shaped double length blades 33, is shown in Fig. 16, in which the blades 33 are made single length and butt welded to a ring 42 which is attached to the inner side of the central blade 39. This arrangement will accomplish its purpose but is not as strong or as easily and cheaply accompished as the preferred method of assembing the blades 33.

The blades 33 extend from the center to a rim 31 which preferably has the inturned lugs 44 struck from the sheet metal strip forming said rim 31 at the spaced intervals desired for the outer ends of the blades 33 so that said outer ends may be spot welded or otherwise attached to the lugs 44. The rim 31 is shaped to attach within the reflector 22 having the out-turned grooved flange 43 as hereinbefore described. It extends around the inner periphery of the outer portion of the reflector 22 and supports the multiple screen-reflector 32 and screen 33 in the headlight type of lamp or all of the blades 33 in the spot light type shown in Fig. 3.

For certain uses it is desirable to use only the parallel rays of reflected light as shown in Figs. 5–8 for both the headlight and spot light types of lamp. Accordingly, the blades 33 are provided with annular turned spaced lugs 45 which are struck from the blades 33 at spaced intervals sufficient to intercept all the direct rays of light, the central rays being intercepted by the blade 39. The lugs 45 are graduated to extend between the spaced blades 33 forming the complete circular or semi-circular ring according to the type of lamp, and thereby controlling the direct rays of light by paralleling or blocking out all rays outside of the parallel reflected rays.

I claim as new:

2. In combination with a parabolic reflector, a cross-bar, a screen member, seated at its base on the cross-bar and covering the upper half of the reflector, and a series of blades secured to and radiating from the center of the cross-bar and covering the lower half of the reflector.

2. In combination with a parabolic reflector, a cross-bar, a screen member seated at its base on the cross-bar and covering the upper half of the reflector, and a series of blades secured to and radiating from the center of the cross-bar and covering the lower half of the reflector, said screen member being bodily tilted at an incline.

3. In combination with a parabolic reflector, a cross-bar, a screen member bodily tilted with respect to the vertical and secured at its base to the cross-bar so as to be held in permanent inclined position thereby, and a series of blades radiating downwardly from the center of the cross-bar.

4. In a screen a cross-bar, a series of semi-circular spaced concentric blades above the cross-bar having their ends affixed to the cross-bar, and a series of blades supported from the cross-bar and radiating downwardly therefrom.

5. In a screen, a rim having spaced peripheral slits extending inwardly from a free edge thereof, the material on one side of the slits being bent inwardly to form lugs extending radially of the rim, and radial blades in the rim secured to the lugs.

6. In a screen, a cross-bar, a series of semi-circular spaced concentric blades above the cross-bar, a series of semi-circular spaced undulating strips in the spaces between the blades, said blades and strips having their ends affixed to the cross-bar and a series of blades supported by the cross-bar and radiating downwardly therefrom.

In testimony whereof I have affixed my signature in the presence of two witnesses.

OTHO M. OTTE.

Witnesses:
H. A. SANDBERG,
I. E. NORDSTROM.